United States Patent Office 3,108,125
Patented Oct. 22, 1963

3,108,125
3α-AMINO-20-BIS(HYDROXYMETHYL)-PREG-
NANES AND PROCESS THEREFOR
Daniel Bertin, Montrouge (Seine), and Hubert Fritel,
Paris, France, assignors to Roussel-UCLAF, S.A.,
Paris, France, a corporation of France
No Drawing. Filed Feb. 8, 1963, Ser. No. 257,076
Claims priority, application France July 5, 1960
10 Claims. (Cl. 260—397.45)

The invention relates to the novel 20-bis-(hydroxymethyl)-pregnane having the formula

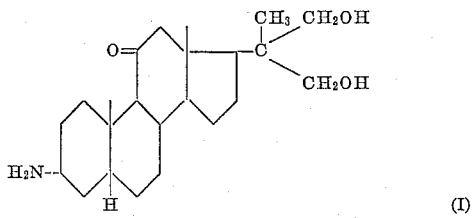

(I)

and its pharmaceutically acceptable acid addition salts. The invention also relates to a novel process for the preparation of the compound of Formula I and to a novel intermediate thereof.

3α - amino - 20 - bis - (hydroxymethyl) - 5β - pregnane-11-one and its acid addition salts, particularly its hydrochloride salt, are noted for their vasodilatatory activity on coronary blood vessels.

It is an object of the invention to provide the novel compound 3α - amino - 20 - bis - (hydroxymethyl) - 5β-pregnane-11-one and its acid addition salts.

It is another object of the invention to provide a novel process for the preparation of 3α-amino-20-bis-(hydroxymethyl)-5β-pregnane-11-one and its acid addition salts.

It is a further object of the invention to provide a novel intermediate compound, namely 3-oximido-20-bis-(hydroxymethyl)-5β-pregnane-11-one.

These and other objects and advantages of the invention will become obvious from the following detailed description.

The novel product of the invention, 3α-amino-20-bis-(hydroxymethyl)-5β-pregnane-11-one, has the formula

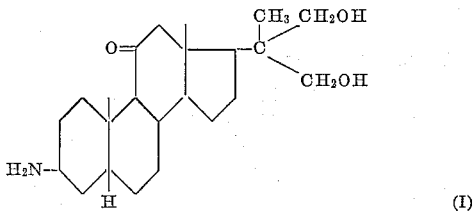

(I)

Examples of acids which are suitable to form the pharmaceutically acceptable acid addition salts of the said compound are mineral acids, such as sulfuric acid, hydrochloric acid, etc. and organic acids, such as tartaric acid, citric acid, etc.

The process of the invention for the preparation of 3α - amino - 20 - bis - (hydroxymethyl) - 5β - pregnane-11-one comprises reacting 20-bis-(hydroxymethyl)-5β-pregnane-3,11-dione with a hydroxylamine compound to form 3 - oximido - 20 - bis - (hydroxymethyl) - 5β-pregnane-11-one, catalytically reducing the latter in the presence of a platinum catalyst to form 3α-amino-20-bis-(hydroxymethyl)-5β-pregnane-11-one and recovering the latter. The acid addition salt of the said 3α-amino compound is easily prepared by reaction with the desired acid.

A preferred mode of the process of the invention comprises reacting 20-bis-(hydroxymethyl)-5β-pregnane-3,11-dione with hydroxylamine hydrochloride in pyridine to form 3 - oximido - 20 - bis - (hydroxymethyl) - 5β-pregnane-11-one, catalytically hydrogenating the latter in the presence of platinum oxide in a lower alkanoic acid, such as acetic acid to form 3α-amino-20-bis-(hydroxymethyl)-5β-pregnane-11-one and recovering the latter. The reaction scheme of the process is illustrated in Table I.

TABLE I

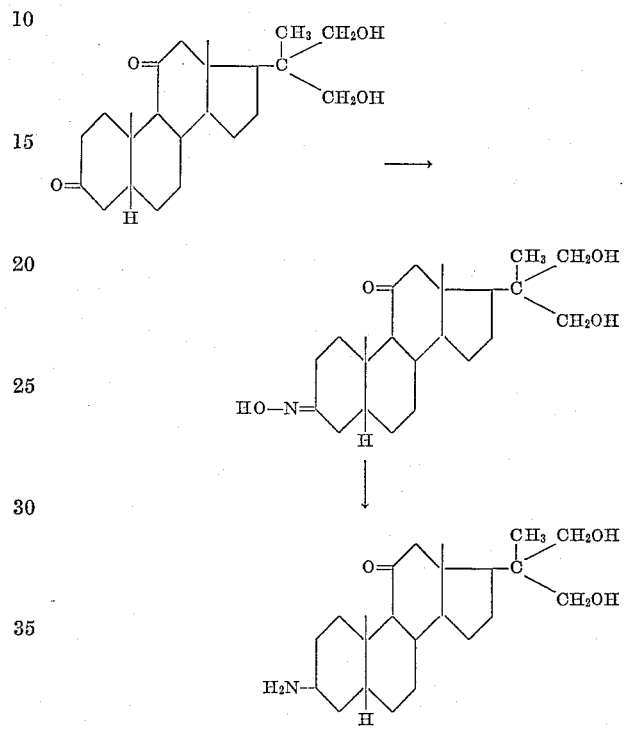

The present application is a continuation-in-part application of applicants' copending application Serial No. 120,160, filed June 28, 1961, now abandoned.

The starting material, 20-bis-(hydroxymethyl)-5β-pregnane-3,11-dione, for the process of the invention can be prepared according to the process described in the commonly assigned, copending application Serial No. 182,679, filed March 26, 1962, by oxidation of the 3-hydroxy group of the acetonide of 20-bis-(hydroxymethyl)-5β-pregnane-3α-ol-11-one to the corresponding 3-keto compound and then freeing the 20-hydroxymethyl groups by said hydrolysis.

In the following example there are described several preferred embodiments to illustrate the invention. However, it should be understood that the invention is not intended to be limited to the specific embodiments.

EXAMPLE

*Preparation of 3α-amino-20-bis-(hydroxymethyl)-5β-pregnane-11-one and its hydrochloride salt*

Step A — Preparation of 3-oximido-20-bis-(hydroxymethyl)-5β-pregnane-11-one. — 404 mg. of 20-bis-(hydroxymethyl)-5β-pregnane-3,11-dione and 150 mg. of hydroxylamine hydrochloride were introduced into 10 cc. of pyridine. The reaction mixture was agitated under a nitrogen atmosphere at 80° C. for a period of two hours and then allowed to cool to room temperature. The volume of the solution was reduced by distillation of a large part of the solvent. 60 cc. of ice water were added slowly under agitation and the mixture allowed to remain for a period of one hour in a refrigerator.

The residue was vacuum filtered, washed with water and dried. The raw product was purified by recrystallization from methanol. There were obtained on recovery of the second lot of crystallization, 341 mg. of 3-oximido-20-bis-(hydroxymethyl)-5β-pregnane-11-one having a melting point of 207° C.

This compound was soluble in methanol, very slightly soluble in acetone, benzene and chloroform, insoluble in water and ether.

*Analysis.*—$C_{23}H_{37}O_4N$; molecular weight=391.54. Calculated: C, 70.55%; H, 9.53%; N, 3.58%; O, 16.35%. Found: C, 70.1%; H, 9.6%; N, 3.6%; O, 17.7%.

This compound is not described in the literature.

The starting compound was prepared according to the technique described in the copending, commonly-assigned United States patent application Serial No. 182,679, filed March 26, 1962, by oxidation of the 3-hydroxyl of the acetonide of 20-bis-(hydroxymethyl)-5β-pregnane-3α-ol-11-one and freeing the 20-hydroxymethyl groups.

*Step B—Preparation of the 3α-amino-20-bis-(hydroxymethyl)-5β-pregnane-11-one.*—A solution of 745 mg. of the compound prepared in step A in 47 cc. of acetic acid was subjected to hydrogenation for a period of three hours in the presence of 750 mg. of prereduced platinum oxide. The catalyst was separated by filtration and the filtrate was poured with agitation into a mixture of 110 cc. of 36° Bé. sodium hydroxide and 220 cc. of ice water. The precipitate formed was extracted several times with methylene chloride. The organic extracts were combined, washed with a saturated sodium chloride solution, dried over sodium sulfate and evaporated to dryness. The residue was dissolved in a mixture of 280 cc. of anhydrous ether and 20 cc. of methylene chloride and then dry gaseous hydrochloric acid was introduced by bubbling therethrough at room temperature.

The precipitate formed was allowed to remain for a period of thirty minutes at about 0° C., then separated by centrifuging. The precipitate was washed with anhydrous ether and dried.

The raw product was purified by dissolution in water and extracted several times with methylene chloride in order to eliminate the non-aminated products. 3α-amino-20-bis-(hydroxymethyl)-5β-pregnane-11-one which was precipitated by alkalizing, salting out with sodium chloride and extracted with methylene chloride, had a melting point of 116–120° C. and a specific rotation $[\alpha]_D^{20}=+40°$ (c.=0.5% in ethanol).

*Step C—Preparation of 3α-amino-20-bis-(hydroxymethyl)-5β-pregnane-11-one-hydrochloride.*—After evaporation to dryness, a new purification was made by recrystallization from isopropanol containing the necessary amount of hydrochloric acid to form the hydrochloride. There were obtained 250 mg. of 3α-amino-20-bis-(hydroxymethyl)-5β-pregnane-11-one in the form of its hydrochloride salt, melting around 300° C., and having a specific rotation $[\alpha]_D^{20}=+23°\pm2°$ (c.=0.5% in water), Cl 8.4% (theoretical 8.6%).

This hydrochloride salt was soluble in water, acids and alcohol, insoluble in ether, acetone, benzene and chloroform.

This compound is not described in the literature.

Various modifications of the process of the invention may be made without departing from the spirit or scope thereof, and it is to be understood that the invention be limited only as described in the appended claims.

We claim:

1. A compound selected from the group consisting of 3α-amino-20-bis-(hydroxymethyl)-5β-pregnane-11-one and its pharmaceutically acceptable acid addition salts.

2. 3α-amino-20-bis-(hydroxymethyl)-5β-pregnane-11-one.

3. 3α-amino-20-bis-(hydroxymethyl)-5β-pregnane-11-one hydrochloride.

4. 3-oximido-20-bis-(hydroxymethyl)-5β-pregnane-11-one.

5. A process for the preparation of 3α-amino-20-bis-(hydroxymethyl)-5β-pregnane-11-one which comprises reacting 20-bis-(hydroxymethyl)-5β-pregnane-3,11-dione with a hydroxylamine compound to form 3-oximido-20-bis-(hydroxymethyl)-5β-pregnane-11-one, catalytically hydrogenating the latter in the presence of a platinum catalyst to form 3α-amino-20-bis-(hydroxymethyl)-5β-pregnane-11-one and recovering the latter.

6. The process of claim 5 wherein 3α-amino-20-bis-(hydroxymethyl)-5β-pregnane-11-one is reacted with an acid selected from the group consisting of mineral acids and organic acids to form the corresponding acid addition salt.

7. The process of claim 5 wherein the platinum catalyst is platinum oxide in acetic acid.

8. The process of claim 5 wherein the hydroxylamine compound is hydroxylamine hydrochloride.

9. A process for the preparation of 3α-amino-20-bis-(hydroxymethyl)-5β-pregnane-11-one which comprises reacting 20-bis-(hydroxymethyl)-5β-pregnane-3,11-dione with hydroxylamine hydrochloride in pyridine to form 3-oximido-20-bis-(hydroxymethyl)-5β-pregnane-11-one, catalytically hydrogenating the latter in the presence of platinum oxide in acetic acid to form 3α-amino-20-bis-(hydroxymethyl)-5β-pregnane-11-one and recovering the latter.

10. The process of claim 9 wherein 3α-amino-20-bis-(hydroxymethyl)-5β-pregnane-11-one is reacted with hydrochloric acid to form 3α-amino-20-bis-(hydroxymethyl)-5β-pregnane-11-one hydrochloride and recovering the latter.

No references cited.